United States Patent [19]

Cole et al.

[11] 4,325,899

[45] Apr. 20, 1982

[54] METHOD FOR HEAT FORMING HARDBOARD AND OTHER TYPES OF FORMING BOARD

[75] Inventors: John N. Cole, Maineville; David A. Hettel, Cincinnati, both of Ohio

[73] Assignee: The Mead Corporation, Dayton, Ohio

[21] Appl. No.: 164,627

[22] Filed: Jun. 30, 1980

[51] Int. Cl.[3] ......................... B29C 1/02; B29C 17/00

[52] U.S. Cl. ...................................... 264/86; 264/119; 264/219; 264/220; 264/320; 425/84; 425/812; 249/113

[58] Field of Search .................. 425/84, 812; 249/113; 264/119, 86, 219, 220, 320

[56] References Cited

U.S. PATENT DOCUMENTS 191,551 6/1877 Scrymgeour ........................ 249/113
399,064 3/1889 McLean .............................. 249/113
1,163,198 12/1915 Atterbury .......................... 249/113

FOREIGN PATENT DOCUMENTS 2552854 6/1976 Fed. Rep. of Germany ........ 425/84

*Primary Examiner*—James B. Lowe
*Attorney, Agent, or Firm*—Biebel, French & Nauman

[57] ABSTRACT

A method and apparatus for heat forming hardboard and other types of forming board including the steps of placing a mesh screen in a die between upper and lower platens having mating contours, placing a sheet of heat formable board in the die upon the screen and below the upper platen, pressing the platens together and heating the sheet such that the sheet and screen are formed to the mating contours and gases and vapors released from the sheet follow the contours of the screen to escape from the die, separating the platens, and removing the sheet from the die.

4 Claims, 4 Drawing Figures

METHOD FOR HEAT FORMING HARDBOARD AND OTHER TYPES OF FORMING BOARD

FIELD OF THE INVENTION

The present invention relates to a method and apparatus for heat forming hardboard and other types of forming board, and more particularly to a method and apparatus for heat forming cellulose-based board sheets having low moisture content.

PRIOR ART

Hardboard is used extensively both domestically and industrially due to its low cost and ease of manufacture. Hardboard usually comprises a cellulose fiber such as ground wood, water, and a binder such as latex, starch, or urea formaldehyde. Of hardboards having the aforementioned compositions, those in which the binder is of latex or uncured urea formaldehyde are known as formable hardboards in that a hardboard sheet of this composition can be formed in a hot press with the application of heat and pressure.

As presently performed, the method of heat forming hardboard includes the steps of placing a sheet of hardboard which has been soaked in water and allowed to age in the wet state for several days and then steamed or dipped in hot water before use between upper and lower platens of a die, bringing the platens together while applying heat and pressure to the hardboard whereby the hardboard is softened and deformed in the die, separating the platens, and removing the hardboard form from the die. During this forming operation, the heat and pressure applied to the hardboard causes the hardboard to generate gases and vapours which are entrapped within the hardboard by the die causing blisters and defects in the finished formed hardboard.

Many methods have been developed for removing the gases generated by the hardboard during the forming cycle. For example, the upper and lower platens can be opened slightly during the forming cycle thus lowering the pressure and allowing the gas to escape. However, this method possesses distinct disadvantages in that the lowering of pressure caused by the separating of the plates results in a longer forming cycle during which the temperature of the formed hardboard drops. The temperature must, then, be re-elevated to a point at which the hardboard is pliable.

A second method involves a use of a perforated metal plate which is placed within the die between the hardboard sheet and the lower platen. The lower platen must be scored or perforated with holes so that the gases generated by the hardboard during the forming operation may travel through the perforated plate and escape through passages in the lower platen of the die rather than become embedded in the hardboard.

Other types of molding process must also deal with the release of gases. One such process is disclosed in the patent to L. N. Eggerstrand, U.S. Pat. No. 3,112,243. TheEggerstrand patent is directed to a method of manufacturing flat hardboard sheets in the first place and not post-forming them. Thus, Eggerstrand produces hardboard from wet lap material having a water content of between 60 and 70 percent by weight. In this process, the wet lap material is sandwiched between two perforated metal plates which are separated from upper and lower platens by wire mesh screens. During the heat forming operation, the upper and lower platens are brought together and the gases generated during the forming operation pass through the perforated plates and the screens to exit the die. The Eggerstrand patent teaches that the perforated plates are necessary to prevent the wet lap material which is formed into hardboard from embedding itself in the wire mesh screens during the forming operation.

Another process of this type is pulp molding. Generally, pulp molding involves the use of a male forming die covered with a wire mesh. The die passes through a stock chest holding an aqueous slurry of cellulose fibers and the required thickness of solids is accreted on the forming surface. Water passing through the die is drawn off by a vacuum.

The male die can be a perforated rigid metal or plastic form, covered on the forming face with a fine wire screen and enclosed at the back to form a vacuum chamber. Thus, during forming, water containing solids are deposited, and the moisture and generated gases flow into the vacuum chamber and are drained off.

This process is often associated with the use of a press die to further dewater the pulp slurry and a female transfer die to carry the pressed shape to an oven for final drying. These features are described in Merges U.S. Pat. No. 4,132,591.

The method and apparatus of the Eggerstrand and Merges are unsuitable for heat forming hardboard sheets for several reasons. The perforated metal plate of the Eggerstrand apparatus would be difficult and costly to be formed to cover the contours of a platen. Indeed, the pressures suggested as optimal by the Eggerstrand patent are between 750 and 1000 lbs/sq. in., more than four times the normal operating pressures of heat forming dies. In addition, the wet lap material required by the method and apparatus disclosed in the Eggerstrand patent preferably have a water content of between 60 and 70 percent by weight. This is three to four times the water content of hardboard normally used in heat forming operations. The pulp slurries of Merges are also of high water content, requiring a vacuum chamber to draw off the moisture.

Accordingly, there is a need for a method and apparatus for heat forming board sheets which can be employed to release gases and vapours generated during the post-forming process and thereby eliminate the formation of blisters and defects in the post-formed sheets. In addition, the method must be cost efficient and applicable to a wide range of platen contours.

SUMMARY OF THE INVENTION

The present invention provides an improved method and apparatus for heat forming hardboard and other types of forming board sheets in which gases and vapours generated during the post-forming process are released harmlessly thereby eliminating the formation of blisters and other defects in the finished part. The invention does not require a reduction of pressure or a separation of platens during the forming operation and thereby greatly increases the cycle time of the forming operation.

In addition, the invention does not require the expensive, high pressure dies, or dies equipped with vacuum chambers. The die pressure required for the process of the invention ranges between 50 and 300 lbs/sq. in., well within the range of dies presently used. The invention also does not require the use of perforated metal sheets which add expense and complexity to the die machinery.

The method and apparatus of the invention can be used to heat form any type of heat formable board, including those types having a water content of from 4 to 12 percent by weight and having, by weight, 43–73% cellulose fiber, 12–30% polyolefin, and 15–45% inorganic filler. The forming boards of that invention require no presoaking or presteaming. The method can also be employed to heat form ordinary hardboard which is presoaked in water resulting in a hardboard with a water content of between 12 and 20 percent by weight. In fact any type of forming board having, preferably, a moisture content of below about 20% can be formed by the process and in the apparatus of the invention.

The method of heat forming board of the invention comprises the steps of placing a mesh screen in a die between upper and lower platens having mating contours, placing a sheet of heat formable board in the die upon the screen and below the upper platen, pressing the platens together and heating the sheet such that the sheet and screen are formed to the mating contours and gases and vapours released from the sheet follow the surface of the screen to escape from the die, and removing the sheet from the die. After this initial cycle is completed and the formed board sheet is removed from the die, successive sheets of heat formable board can be placed in the die without need of adjusting or replacing the mesh screen. As a result of the low water content of the heat forming board which can be used with this method, the board does not embed itself in the mesh screen during the heat forming process. Therefore, there is no need to include a step of the process during which the formed board is separated from the screen.

It is desirable to use a mesh screen sized so that a border extends about the periphery of the die between the platens. After the initial forming operation, the screen can be trimmed so that a uniform border exists about the die.

Accordingly, it is an object of this invention to provide a method and apparatus for heat forming hardboard and other types of forming board in which the gases produced by the board during the forming operation can be vented safely to the outside of the die thereby eliminating the formation of blisters and other defects in the finished part; to provide a method and apparatus for heat forming board which obviates the necessity of reducing the pressure and separating the platens during the forming cycle to allow gases and vapours to escape; and to provide a method and apparatus for heat forming board sheets which can accommodate any type of heat formable board, including those having a low water.

Other objects and advantages of the invention will be apparent from the following description, the accompanying drawings and the appended claims.

DETAILED DESCRIPTION OF THE PREFERRED EMBODIMENT

Figure 1:
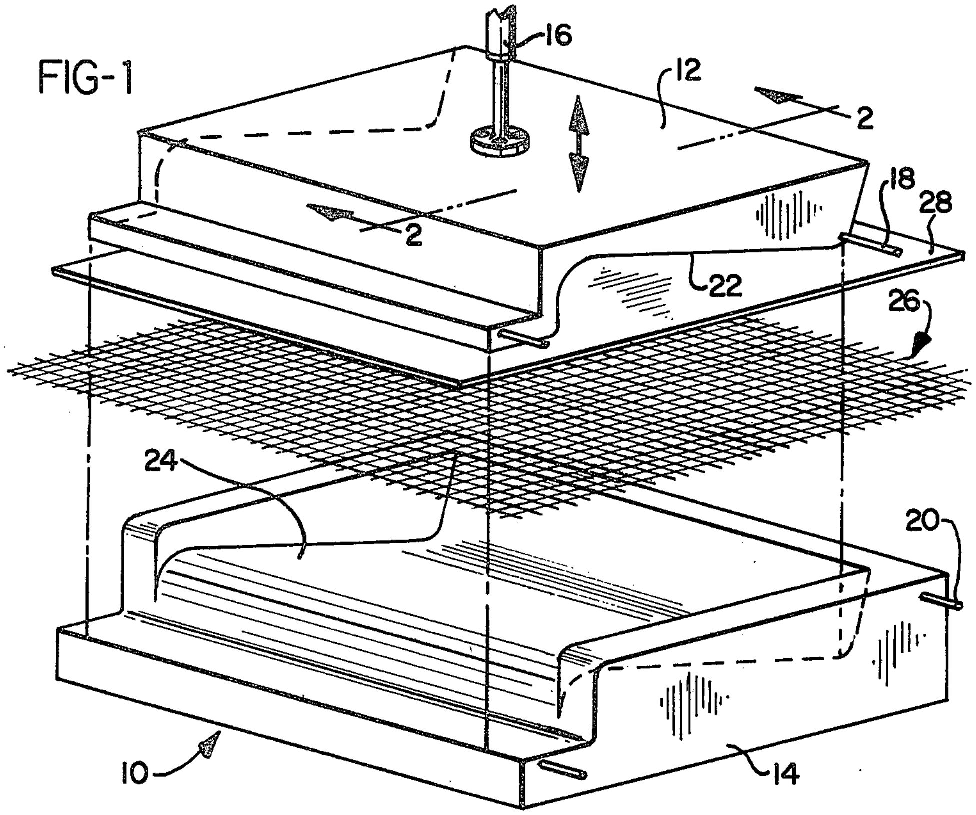
FIG. 1 is a perspective view of a die of the invention showing the upper and lower platens separated.

As shown in FIG. 1, the apparatus of the present invention starts with a conventional die, generally designated 10, having an upper platen 12, lower platen 14, and hydraulic ram 16. The lower platen 14 is usually mounted on a rigid support, not shown. The upper and lower platens 12, 14, have embedded within them heating elements 18, 20, respectively, which preferably are electric resistance elements or conduits carrying heated oil. The upper and lower platens 12, 14 have mating contours 22, 24 respectively that matingly engage when the platens are urged together.

A wire mesh screen 26, in the form of a sheet, is positioned upon the lower platen 14 and the heat formable board 28 to be formed is placed upon the screen.

Figure 2A:
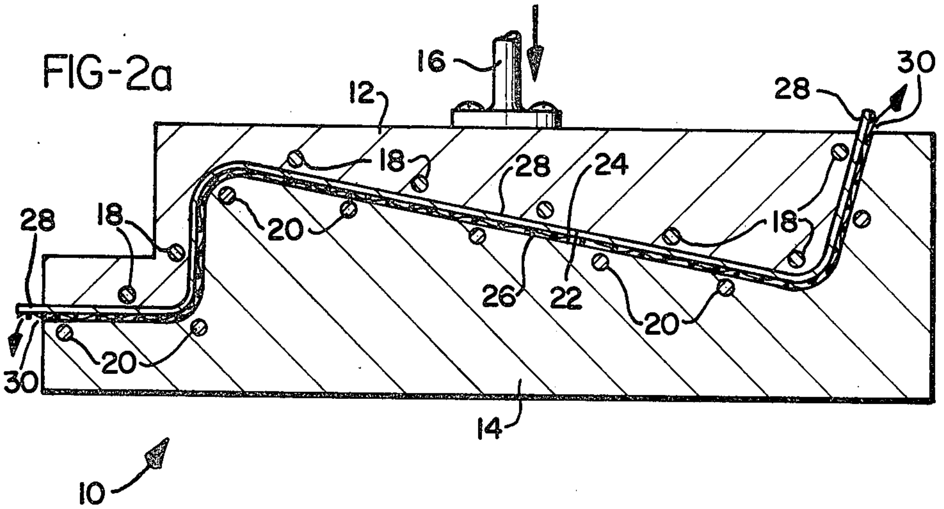
FIG. 2*a* is a section in elevation of the die of FIG. 1 taken along line 2—2 and showing the upper and lower platens engaging the forming board and wire mesh.
Figure 2B:
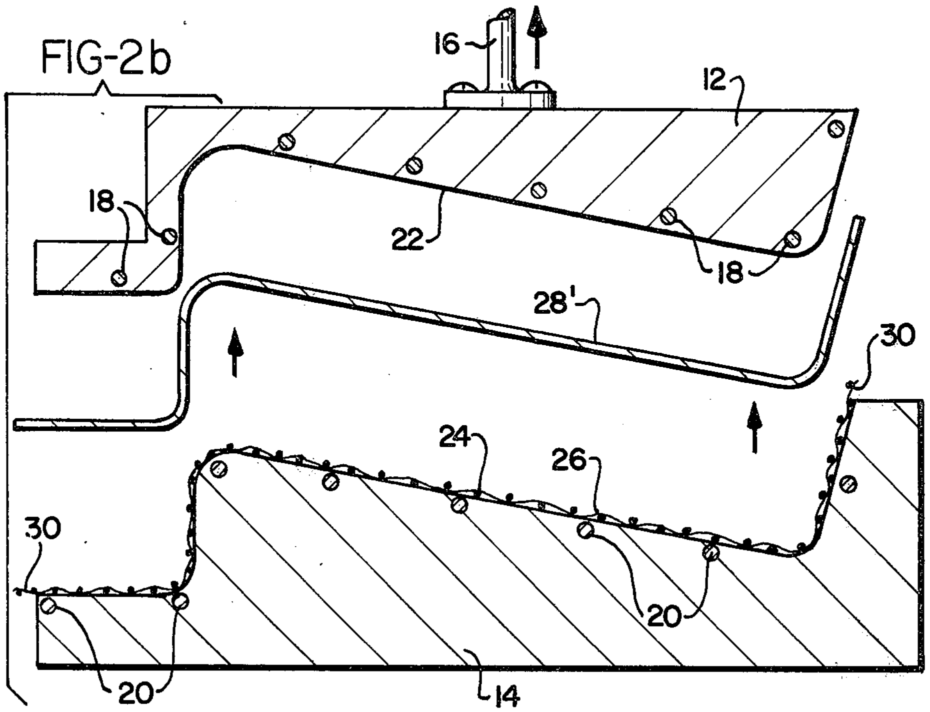
FIG. 2*b* is the section of FIG. 2*a* showing the upper and lower platens separated and the formed board removed from the lower platen.
Figure 2C:
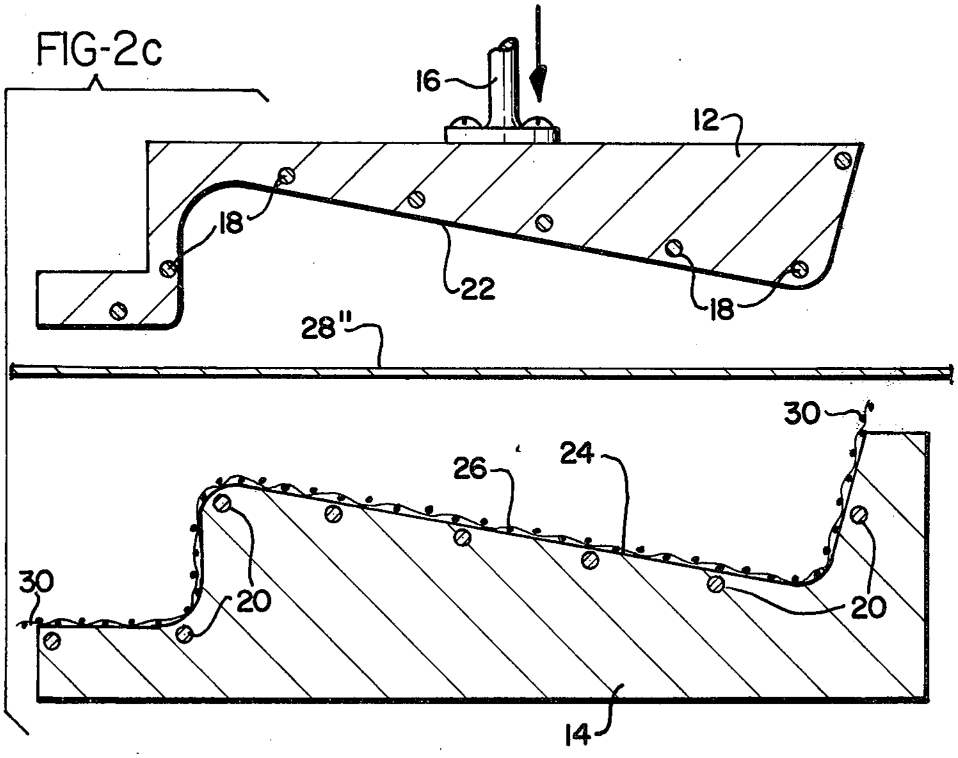
FIG. 2*c* is the section of FIG. 2*a* showing the formed board removed and a new sheet of board interposed between the upper and lower platens.

The heat forming process, shown in FIGS. 2*a*, 2*b* and 2*c* is as follows. After the wire mesh screen 26 is placed upon the lower platen 14 and the heat formable board 28 is placed upon the wire mesh screen, the hydraulic ram 16 forces upper and lower platens 12, 14 together and the platens heated using heating elements 18, 20. As the upper and lower platens 12, 14 apply heat and pressure to the screen 26 and board 28, the forming board softens and the board and screen deform into the mating contours 22, 24 of the platens. It is important that the screen 26 be large enough so that a border 30 extends beyond the die after the screen is deformed into the lower platen 14.

It is during this step of the forming process, shown in FIG. 2*a*, that harmful gases and vapours are produced by the board 28. If not allowed to escape, these gases could result in blistering and other defects in the finished formed board part. Since the board 28 is in contact with the screen 26 to the extent that the board partially embeds itself in the screen, the gases produced are permitted to travel along the wires of the screen until they reach the border 30 outside of the die 10 and escape into the atmosphere. The gases are driven along the wires and out of the die 10 by the continued application of heat and pressure from the upper and lower platens 12, 14.

After the forming process is completed, the upper and lower platens 12, 14 are separated and the formed board 28' is then lifted from the lower platen and screen 26 as shown in FIG. 2*b*. The screen 26, now deformed into the recess of the lower platen 14, can be trimmed so that a uniform border 30 exists about the periphery of the lower platen 14.

Because the composition of the board 28 used in the method of the present invention may have a low water content and it only partially embeds itself in the screen 26, the forming board can be removed from the screen without the necessity of removing both the forming board and the screen from the lower platen 14 and performing an additional step of stripping the screen from the formed board 28'. In this fashion, the screen 26 has been deformed to conform to the mating contours 22, 24 of the upper and lower platens 12, 14 simultaneously with the steps of forming the initial heat formable board sheet 28. Thus, steps in which a wire mesh screen or other porous sheet is deformed to conform to the mating contours 22, 24 of upper and lower platens 12, 14 prior to the heat forming process of the board 28 are eliminated, resulting in increased economy and reduced operation time.

As shown in FIG. 2*c*, after the formed board 28' is removed from the die 10, a new sheet of heat formable board 28 can be interposed between the upper platen 12 and the lower platen 14, which now is lined with the screen 26 deformed to match the mating contours 22, 24 of the platens. The process can now begin again and can continue indefinitely, interrupted only be shutdowns for intermittent cleaning of the screen 26 and platens 12, 14.

The process of the invention preferably is performed on heat formable hardboards comprising ground wood or cellulose fiber, water, and a binder such as latex and uncured or partially cured urea formaldehyde as well as the forming boards having, by weight, 43–73% cellulose fiber, 12–30% polyolefin, and 15–45% inorganic filler which have a low water content, i.e. between 4 to 12 percent. Other hardboards can be used if they are presoaked in water to give them a water content of between 12 and 20 percent. The die pressures involved are preferably between 50 and 300 lbs/sq. in. The temperatures involved are those only sufficient enough to cause the heat formable board to become pliable enough to deform into the mating contours of the platens: around 310°–450° F. and, typically, between 340° F. and 420° F., is used to form a forming board sheet of the preferred type having the aforementioned composition of cellulose fiber, polyolefin, and filler i.e. containing approximately 65% cellulose fibers, 15% of polypropylene fibers, and 20% talc. Of course other temperatures and pressures may also be used. For instance, if an alternative embodiment of forming board having the aforementioned composition of cellulose fiber, polyolefin, and filler and which includes a low melting point polyethylene rather than polypropylene, is used, then, the temperature applied may be lowered accordingly.

The time of heat forming will vary depending on temperature, the higher the temperature, the shorter the dwell time in the die. For example, at high temperature and pressure it is necessary to apply pressure for as little as 5 seconds; whereas, at lower temperatures and pressures, a dwell time of up to 1½ minutes might be required.

The screens used can vary in size from standard aluminum window screen to half-inch galvanized hardware cloth. It is preferable to use a screen having a sufficient size so that during the forming process the screen leaves a channel between the board being formed and the lower platen without marking the board to the extent that it causes "show through". For example, with 0.10 inch board the best screen would be ⅛ inch hardware cloth. As the thickness of the forming board increases, which requires a concomitant increase in the pressure exerted by the platens, larger mesh screens with larger diameter wires should be used, preferably on the order of ¼ inch hardware cloth or ½ inch hardware cloth. Similarly, as the thickness of the heat formable board decreases and accompanying pressure of the platens decreases, the mesh size of the screen and the wire diameter should also decrease. It has been found that the most versatile screen size is the ⅛ inch hardware cloth which can be used for a variety of thicknesses of forming board products and for a wide range of forming pressures.

EXAMPLE

To demonstrate the effectiveness of the present invention, a heat forming board of the type made from a mixture of 3300 pounds of cellulose fibers in the form of corrugated box clippings, 762 pounds of polypropylene fiber, Pulpex P, from Hercules, Inc., and 1,015 pounds of Vermont talc, and having a moisture content of approximately 3% was formed on an Inkster hydraulic press. The die had an upper platen temperature of 340° F. and a lower platen temperature of 360° F. No screen was used. The forming board was placed in the die and the die closed and built up to a gauge pressure of 1500 psi (pump pressure supplied to the hydraulic run; equating to around 300 psi die pressure). The die was held closed for 60 seconds. On opening the formed product was blistered and unacceptable commercially. Pump gauge pressure was lowered to 1300 psi on a new run which was otherwise the same, but the results were also the same. Pump pressure was lowered to 1000 psi, 750 psi, and, then, 500 psi on subsequent runs—all with the same results. An acceptable product was not formed until the pump pressure was reduced to 250 psi (equating to around 50 psi die pressure) and even then the time in the die had to be doubled to 120 seconds to give this result.

In a second series of runs, the method and apparatus of the present invention were used. A flat screen in the form of a one-eight (⅛) inch hardware cloth was placed adjacent the bottom platen and formed with the same type of heat forming board used in the first series of runs. The pressure used was a pump gauge pressure of 250 psi. In subsequent runs the pump gauge pressure was raised to 500, 700, 1300 and, finally, 1500 psi. All runs were at 60 seconds forming time and in instances an acceptable product was formed. At a pump gauge pressure of 1500 psi an acceptable product can be formed in 30 seconds.

While the process and apparatus herein described constitutes a preferred embodiment of this invention, it is to be understood that the invention is not limited to this precise process or apparatus, and that changes may be made therein without departing from the scope of the invention.

What is claimed is:

1. A method of heat forming board sheets comprising the steps of:

(a) placing a cheet of heat formable board, having a water content below about 20 percent by weight, a cellulose content of between 43 and 73 percent by weight, and a polyolefin binder of between 12 and 30 percent by weight in a die having upper and lower platens with mating contours, and having a mesh screen located adjacent one of said platens, said screen being sized to extend outward to form a border about the periphery of said die between said upper and lower platens;

(b) pressing said platens together thereby imposing a pressure upon said sheet of between 50 and 300 pounds per square inch and heating said sheet such that said sheet becomes plastic and is formed by said platens to said mating contours but said sheet does not become embedded in said screen, and gases released from said sheet follow the contours of said screen to escape from said die;

(c) separating said platens; and (d) removing said formed sheet from said die and from said screen.

2. The method of claim 1 wherein said mesh screen is initially placed in said die during the first heat forming operation and is thereby formed to said mating contours, said formed screen remaining in place adjacent one of said platens during subsequent heat forming operations.

3. The method of claim 1 wherein said sheet is a forming board containing 4–12 percent moisture.

4. The method of claim 1 wherein said platens are heated from about 310° F. to about 450° F.

* * * * *

UNITED STATES PATENT AND TRADEMARK OFFICE

CERTIFICATE OF CORRECTION

PATENT NO. : 4,325,899

DATED : April 20, 1982

INVENTOR(S) : John Nicholas Cole and David Arthur Hettel

It is certified that error appears in the above—identified patent and that said Letters Patent is hereby corrected as shown below:

Col. 5, line 7, "be" should be --by--.

Col 6, line 38, "cheet" should be --sheet--.

Signed and Sealed this

*Twenty-second* Day of *June 1982*

[SEAL]

*Attest:*

GERALD J. MOSSINGHOFF

*Attesting Officer* *Commissioner of Patents and Trademarks*